(12) United States Patent
Del Core

(10) Patent No.: US 10,780,786 B2
(45) Date of Patent: Sep. 22, 2020

(54) ADAPTIVE THERMAL MANAGEMENT OF AN ELECTRIC ENERGY STORAGE METHOD AND SYSTEM APPARATUS

(71) Applicant: Robert Del Core, San Diego, CA (US)

(72) Inventor: Robert Del Core, San Diego, CA (US)

(*) Notice: Subject to any disclaimer, the term of this patent is extended or adjusted under 35 U.S.C. 154(b) by 531 days.

(21) Appl. No.: 15/726,397

(22) Filed: Oct. 6, 2017

(65) Prior Publication Data

US 2018/0029483 A1   Feb. 1, 2018

Related U.S. Application Data

(63) Continuation-in-part of application No. 14/035,482, filed on Sep. 24, 2013, now Pat. No. 9,827,871.

(Continued)

(51) Int. Cl.

| | |
|---|---|
| *B60L 11/18* | (2006.01) |
| *B60L 11/02* | (2006.01) |
| *B60L 8/00* | (2006.01) |
| *H01M 10/625* | (2014.01) |
| *H01M 10/44* | (2006.01) |
| *H01M 10/613* | (2014.01) |
| *H01M 10/63* | (2014.01) |
| *B60L 58/27* | (2019.01) |
| *B60L 58/40* | (2019.01) |

(Continued)

(52) U.S. Cl.
CPC .............. *B60L 11/187* (2013.01); *B60L 8/006* (2013.01); *B60L 50/10* (2019.02); *B60L 50/40* (2019.02); *B60L 58/24* (2019.02); *B60L 58/26* (2019.02); *B60L 58/27* (2019.02); *B60L 58/40* (2019.02); *H01M 10/44* (2013.01); *H01M 10/613* (2015.04); *H01M 10/625* (2015.04); *H01M 10/63* (2015.04); *B60L 2240/42* (2013.01); *B60L 2240/545* (2013.01); *B60L 2240/547* (2013.01); *B60L 2240/549* (2013.01); *B60L 2240/662* (2013.01); *Y02T 10/705* (2013.01); *Y02T 10/7005* (2013.01); *Y02T 10/7291* (2013.01); *Y02T 90/16* (2013.01)

(58) Field of Classification Search
CPC .... B60L 11/1874; B60L 11/18; B60L 11/187; B60L 11/02; B60L 11/005; B60L 8/006; B60L 2240/549; B60L 2240/545; B60L 2240/547; B60L 2240/662; B60L 2240/42; B60L 58/24; B60L 58/40; B60L 58/26; B60L 58/27; B60L 50/10; B60L 50/40; H01M 10/625; H01M 10/44; H01M 10/63; H01M 10/613; Y02T 10/7005; Y02T 10/705; Y02T 10/7291; Y02T 90/16
USPC ....................................................... 320/136
See application file for complete search history.

(56) References Cited

U.S. PATENT DOCUMENTS 5,623,232 A * 4/1997 Halbert ............... H01L 27/0203
                                                330/266
7,821,282 B2 * 10/2010 Kurahashi ................ H02P 6/28
                                                324/764.01

(Continued)

*Primary Examiner* — Richard Isla
*Assistant Examiner* — Dung V Bui
(74) *Attorney, Agent, or Firm* — Enrique A. Monteagudo, Esq.

(57) ABSTRACT

A system, method, and computer-readable storage medium to dynamically manage heat in an electric energy storage system, such as a battery pack or ultra-capacitor pack system in a system or device having a variable electrical loads that may impact performance or life, such as in an electric vehicle.

7 Claims, 13 Drawing Sheets

Related U.S. Application Data

(60) Provisional application No. 61/704,891, filed on Sep. 24, 2012.

(51) Int. Cl.
  *B60L 58/26* (2019.01)
  *B60L 58/24* (2019.01)
  *B60L 50/10* (2019.01)
  *B60L 50/40* (2019.01)

(56) References Cited

U.S. PATENT DOCUMENTS

| | | | | |
|---|---|---|---|---|
| 2003/0118891 A1* | 6/2003 | Saito | .................... | H01M 10/617 |
| | | | | 429/62 |
| 2004/0128086 A1* | 7/2004 | Barsoukov | ............ | G01R 31/367 |
| | | | | 702/63 |
| 2010/0256864 A1* | 10/2010 | Ying | ..................... | H04L 63/083 |
| | | | | 701/31.4 |
| 2010/0290386 A1* | 11/2010 | Cabral Hinojosa | .......................... | |
| | | | | H04B 7/15557 |
| | | | | 370/315 |
| 2011/0210703 A1* | 9/2011 | Souza | .................... | H02J 7/0091 |
| | | | | 320/136 |
| 2012/0028087 A1* | 2/2012 | Gaben | ..................... | B60L 58/25 |
| | | | | 429/50 |
| 2014/0067297 A1* | 3/2014 | Prada | .................. | H01M 10/486 |
| | | | | 702/63 |

* cited by examiner

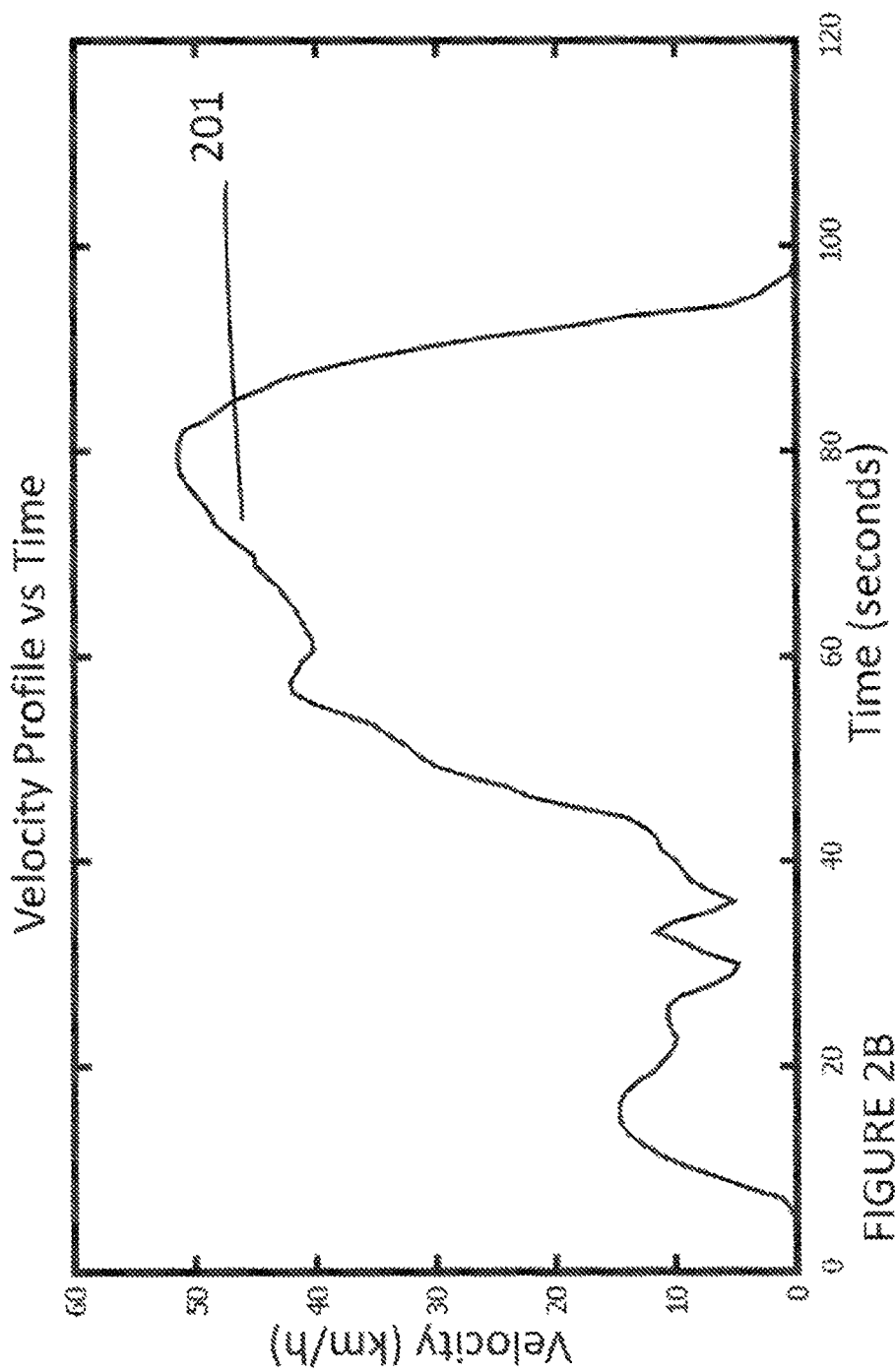

ADAPTIVE THERMAL MANAGEMENT OF AN ELECTRIC ENERGY STORAGE METHOD AND SYSTEM APPARATUS

RELATED APPLICATIONS

This application claims priority to U.S. patent application Ser. No. 14/035,482 filed on Sep. 24, 2013, which claims priority to U.S. Provisional Application No. 61/704,891, filed on Sep. 24, 2012, both of which are incorporated by reference herein in their entirety.

BACKGROUND OF THE INVENTION

1. Technical Field

Aspects of the present disclosure generally relate to electric energy storage systems, and more particularly to thermal management of electric energy storage systems.

2. Related Art

Electric powered vehicles for transportation offer reduction of harmful emissions in our environment, improved fuel economy and strengthened security of energy supply. Generally speaking, electric vehicles (EVs) may include road and rail vehicles, surface and underwater vessels, electric aircraft and electric spacecraft. An EV may be powered by stored energy, generated energy, or a combination of both. Onboard energy is commonly generated using an internal combustion engine, a fuel cell, solar cells, etc. Typically, an electrical energy storage system is required to power electric vehicles. Other components that make up the rest of the drive system include traction motor(s) interfaced to the vehicle wheel system, high and low voltage power electronics, electrically powered accessories, system controls and vehicle interface.

Energy storage systems are created with a plurality of energy storage cells connected electrically to form a stack or module of cells configured in series or parallel to provide power and energy required for an application. Energy storage cells are typically battery cells or ultracapacitor cells. Depending on the power and energy granularity of the stack, there are stacks electrically connected in a system. In use under a typical charge/discharge duty cycle, the battery cells produce heat which must be controlled in order to maximize life of the elements and minimize the risk of thermal runaway. Electric energy storage systems may have higher performance and longer life when sufficiently cooled. Thermal management of electric energy storage systems may present unique challenges when the duty cycle of the energy storage system is variable, such as in an electric vehicle. Further, thermal management may be beneficial in other energy storage systems having variable or otherwise irregular duty cycles, such as vehicle to grid power supply, windmills, electric lifts, large user-operated electric equipment, etc.

To optimize the safety, reliability, performance, active thermal management systems are often incorporated into the energy storage system. Active thermal management is generally accomplished by circulating a heat exchange fluid such as air or liquid or other media, using integrated HVAC units, or hybrid internal air circulation in conjunction with a water based chiller system, or Peltier thermal electric systems. Any HVAC system that is capable of adding or removing sufficient heat to an energy storage cell can be used with this present embodiment. Examples of different cooling circuit topologies in prior art used for thermal conditioning include liquid cooling loops to liquid air heat exchanger, air circulation, internal air circulation with air/water heat exchanger, dual cooling loops connected via a water heat exchanger are some commonly used topologies.

Prior to use, a battery system is thermally conditioned to some temperature value within the battery cell manufacturer's prescribed temperature range. Battery thermal preconditioning can be accomplished with logic that observes the ambient temperature during grid connected charging or charging from another source. The HVAC system draws power from the grid to heat the battery to an optimal temperature before charging begins. In cases when ambient temperatures are higher than the manufacturer's range, the charge control logic can cool the battery pack to desired levels before charging commences. For example, under charging scenario with low ambient temperatures, the vehicle's charge controller logic can activate a heating system interfaced to heat exchanger (4) via communication boundary (7). Under charge, pump (3) circulates fluid heated by the HVAC system connected to heat exchanger (4). In an alternate configuration an in line immersion heater is commonly incorporated into the thermal loop with various flow control devices. Prior art extends this concept to the occupants cabin of the vehicle, where pre-heating of the interior and pre-cooling of the interior is performed during charge to maximize drivers and passenger comfort and maximize vehicle range. Once the battery is preconditioned, the embodiment can be used to condition the battery if the vehicle is participating in a vehicle to grid application, or "V2G", where the load center is the grid instead of the traction motor.

As an ESS is charged and discharged during use, heat is generated in the battery cells due to the cells internal resistances which ultimately results in a rise of temperature. If the heat is not rejected sufficiently fast or if the battery is allowed to operate outside of specified limits the battery will suffer reduced life, efficiency and performance, and ultimately fail. An active thermal management system is generally required to control the temperature so as to maintain the cell temperatures within an optimal temperature range. The optimal temperature range is normally prescribed by the energy storage cell manufacturer. Power is required to run the HVAC system which impacts the overall driving range and efficiency of the electric vehicle.

It is well known that battery life and capacity is extremely sensitive to temperature, requiring that the battery cells be operated within a well-defined temperature band. Conventional systems monitor every cell in a battery pack which increases packaging complexity and cost, and potential failure points. In addition, control methods have logic algorithms that are based on conservative threshold approach where corrective actions are based on readings that approach preset levels, which often result in an overshoot of target temperatures requiring aggressive compensation from the thermal management system, thus a reduction in efficiency. Such methods present the risk that operating limits are exceeded thus presenting a warranty issue with the battery cell supplier, reduced battery life, excess balancing required from the BMS due to thermal imbalances and swings.

BRIEF SUMMARY OF THE INVENTION

Embodiments include a system, device, method and computer-readable medium to dynamically manage heat in an electric energy storage system.

In one embodiment, an apparatus comprises an energy storage system and a thermal management system. The energy storage system with an energy storage module connectable to a load. The thermal management system for regulation of operating temperature within limits prescribed by a battery manufacturer. The thermal management system is configured to an input signal measuring a parameter indicative of current drawn from a battery, to receive an input signal measuring a process parameter of cell temperature useful in the operation of the thermal management system, to receive an input signal measuring a process parameter of ambient temperature for operation of the thermal management system, to receive an input signal from a control device that requests current be drawn from the battery at a specific time, at a specified current, and to output the allowable current to be drawn to a vehicle controller.

In some embodiments, the input and output signals are discrete.

In some embodiments, the apparatus is connectable to an existing communication control network without modification of other devices on that control network.

In some embodiments, the apparatus may further comprise a computation device to compute an averaged current from the energy storage system, and a storage device to store a computed value to be used in calculating a temperature setpoint.

In some embodiments, the computation device is further configured to compute a partial differential equation or "PDE" (e.g., partial differential transient heat equation for the generation of control signal).

In some embodiments, the computation device is further configured to compute a multidimensional transient heat/energy equation which may also include a numerical representation of the entire thermal management system connected with the energy storage system for the generation of a control signal In another embodiment, the computation device is further configured to compute a system of partial differential continuity, momentum and energy equations representing the energy storage system and the thermal management system for the generation of a control signal.

In some embodiments, the apparatus further comprises an actuator in the form of a dry contact, PWM signal generator, or relay center, that interfaces to the vehicle HVAC system and commands the vehicle HVAC system.

In some embodiments, the temperature setpoint is determined by the control expression, $$T\_setpoint = T\_setpoint\_max - M*((I\_AVG*\alpha + (1-\alpha)*I\_CDR)^2 * R\_internal / (A*(I\_AVG*\alpha + (1-\alpha)*I\_CDR)^B * A cell))$$

where,

T_setpoint_max is the temperature maximum setpoint of the system HVAC in accordance with an embodiment;

M is a parameter determining a mapping function that maps allowable temperature rise to maximum and minimum;

I_AVG is the average current of the battery duty cycle;

$\alpha$ is a weight parameter associated with current I;

I_CDR is Current Draw Request or the current requested of the vehicle's drive system; and A, B, R_internal and Acell are generally considered properties and/or of the cell and energy storage cell assembly.

In some embodiments, M is determined by a mapping function that maps allowable temperature rise to maximum and minimum set points in an inverse manner by a linear function. In some other embodiments, the M is determined by a mapping function that maps allowable temperature rise to maximum and minimum set points in an inverse manner by a higher order polynomial function.

In some embodiments, the I_AVG is computed using a time average value of actual current the electrical energy storage system is delivering over a tunable preset time interval.

In some embodiments, the requested current may be used to compute the temperature setpoint.

In some embodiments, a function in the form of $K_1\alpha + (1-\alpha)K_2$ may be used to weight the average current ($K_1$=I_AVG) and a requested current ($K_2$=I_CDR) to compute a weighted average current with weight $\alpha$, such that $\alpha$ is a number between 0 and 1.

In some embodiments, the $\alpha$ the $\alpha$ function of the energy storage state of charge ("SOC") or $\alpha$=1-SOC.

In some embodiments, temperature rise (dT) for generating time dependent boundary conditions for a 1-dimensional numerical model of the battery and cell and surrounding structure is given by a temperature rise relation $$dT = I^2 R / AI^B A cell,$$

where

I(t) @ t=t+dt is found by interpolation between the current request points I(t) @ t=t and I(t) @ t=t+dt In some embodiments, the a 1-dimensional time dependent partial differential heat equation is numerically solved to obtain a virtual average cell temperature using a one dimensional model of the cell, thus reducing the number of required sensors in the battery array In some embodiments, a multidimensional partial differential equation of continuity, momentum and energy may be numerically solved to obtain a virtual cell temperature using a geometric model of the cells, module, and system, thus reducing the number of required sensors in the battery array.

In some embodiments, the a partial differential equation (PDE) solution is compared with T_Actual (e.g. taken from a sensor reading) to determine cells are within temperature limits, and issue a current rate to some pre-set value determine by the invention In some embodiments, the T_cell (e.g. a sensor reading of temperature of an energy storage cell)] and the TPDE [e.g., temperature computed from the solution of a partial differential equation) are compared to determine SOH (State of Health) as time progresses, issuing a diagnostic message if the difference grows beyond bound.

In some embodiments, the energy storage system and thermal management system are included in a vehicle.

In some embodiments, the adaptive thermal management control unit may be included in the overall system controller of a variable electric load (e.g., an ECU/EVCU/VCU/OSC/VOSC an electric vehicle).

In some embodiments, the adaptive thermal management control unit may be a standalone device but included in the overall vehicle In some embodiments, the controller may include a high performance numerical computation unit such as a CPU, FPGA, ASIC, GPU, DSP or plurality of this computation units in parallel.

In some embodiments, the Max_temperature_rise@C (maximum "not to be exceeded" temperature increase at "rated C" or maximum charge/discharge rate) is given by $$Max\_temperature\_rise = I^2 R\_internal / (AI^B) A cell$$

where

A, B, R_internal and Acell are properties of the cell and energy storage cell assembly.

In some embodiments Max_temperature_rise (max_dT) may specifically equal or approximate 22 degrees Celsius. In some embodiments, the Max_temperature_rise @ C is determined by a lookup table, (e.g., max_dT=22 degrees Celsius).

BRIEF DESCRIPTION OF THE DRAWINGS

FIG. 2B graphically illustrates a close-up of a typical electric drive schedule, for purpose of illustrating the embodiment.

DETAILED DESCRIPTION

Figure 1:
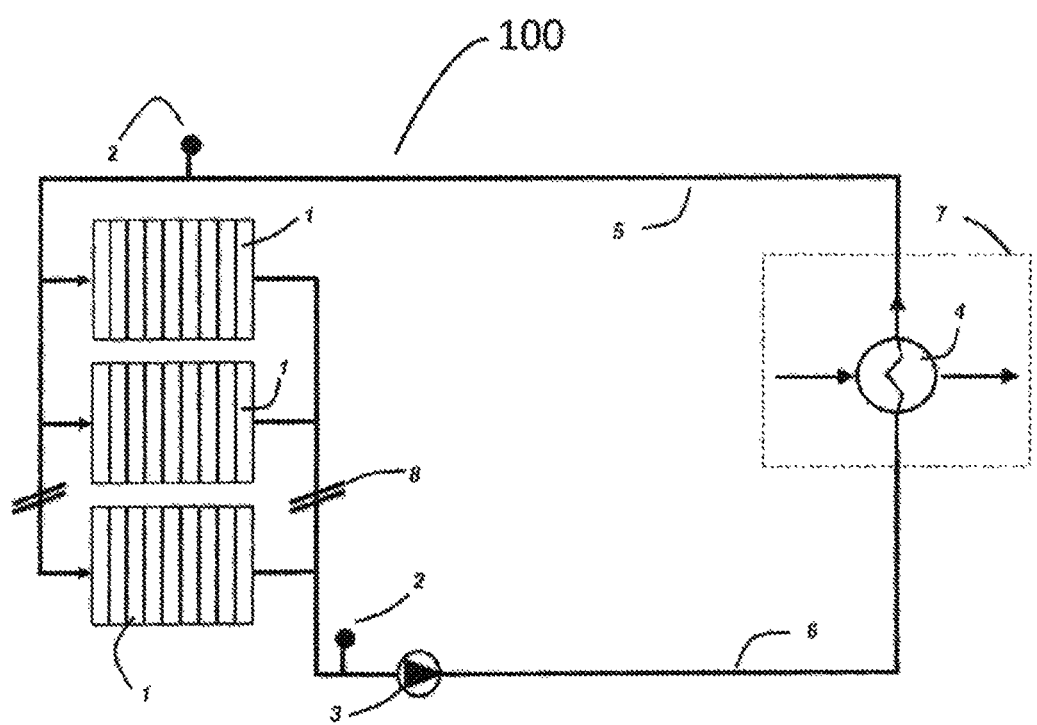
FIG. 1 is an illustrative schematic that is useful in describing the present embodiment and is a schematic of an exemplary thermal management system.

One aspect of the disclosure pertains generally to the field of thermal management systems for an electric energy storage system such as a battery pack or ultra-capacitor pack system for use in system or device having variable electric load. In particular, aspects of the present disclosure relate to a system and method of efficiently controlling the temperature of an electric energy storage system having thermal considerations that may affect performance and life, such as in an electric vehicle or heavy duty/high power electric equipment.

An application of this disclosure also pertains to electrical energy storage thermal management method for electric vehicles such as automobiles, light duty commercial vehicles, heavy duty commercial vehicles such as transit buses, material handling equipment such as port cranes, trucks and forklifts that utilize an electric energy storage system such as batteries, ultra capacitors or combinations thereof. In addition, the embodiment also applies to other non-mobility applications such as grid energy storage, remote power and backup power systems, and wind turbine power generators for pitch control and line power stabilization to name a few. In particular, this embodiment has great applicability in the field of electric vehicle energy storage thermal management where high duty cycles are typically encountered.

Another aspect of the disclosure includes the realization that active thermal management systems should be extremely efficient since they present themselves to the overall drive system as a significant parasitic load. Overall range of the electric vehicle can be reduced since they consume a great deal of energy. Consequently, embodiments of the disclosure include: 1) an efficient system, method and apparatus for maximizing the life of a battery pack without increasing cost 2) and efficient system, method and apparatus that maximizes overall electric vehicle range by predicting the anticipated set point required for thermal management, actuating a device in a manner that tracks the overall duty cycle of the vehicle and 3) a system that allows for the reduction of battery temperature sense hardware and associated wiring. The present embodiment provides such a method. In addition, depending on the duty cycle, battery temperatures can continue to rise for a short period of time even once the battery current has been cut or reduced.

The embodiments include a communication interface, a processor and an actuator. The method includes acquiring a plurality of values based on an operating profile and parameter values that are indicative of current, and setting operating value thresholds. In the present embodiment, the thermal management system setpoint is determined as a function of battery pack current and/or battery pack current draw request (CDR) and time averaged battery current. Battery temperature rise (dT) is determined with a relation in the form of $$I^2 R = hAdT,$$

where:

I is the battery current;

R is the internal resistance of the battery, which may vary with the State of Charge (SOC), State of Health (SOH) and other battery cell properties;

h is a heat transfer coefficient, a property of the cell and cell package superstructure inside the battery module;

A is the cell cross sectional area of the cell; and dT is the associated rise in temperature under charge and discharge current during operation.

Manufacturer cell data of the chemistry and package and/or a first principle model of the cell may be used dynamically in real time to characterize the cell used in the application. Dynamically solving a battery chemistry model is another embodiment of the present embodiment.

In the current embodiment, a temperature rise equation (e.g. dT) is constructed using the following form:

$$\text{temperature\_rise} = \text{yint}^2 * \text{R\_internal} / ((A*\text{yint}^B)*\text{Acell}))$$

where:

yint is the interpolated current rather measured or computed current.

Other forms of this equation are possible. In another embodiment, a first principle model of the cell that characterizes the physical and electrical properties of the cell, this describing heat rise can be solved in real time within the apparatus to compute the result in the above expression.

Dynamically solving a multidimensional system of partial differential equations (pde's) describing continuity, momentum and energy relations for the energy storage system, thermal system, and combination of energy storage system and thermal system is another embodiment of the present embodiment.

Current data as a function if time I(t) from either the vehicle simulation or real world data is used as input to the above equation to analytically determine temperature rise as a function of time.

In the current embodiment the control rule is developed by way of the following process:

a. Identify the maximum temperature rise for the specific cell chemistry. A source of this information can come from manufacturer's test data, physical tests conducted by a third part familiar in the art of energy storage cell testing, or a verified and calibrated first principle model that can accurately predict the temperature response of a cell to within some pre-established acceptable tolerance b. As an illustration, the maximum temperature rise based derived from manufacturer data. For illustrative purposes given the manufacturer cell data, temperature rise ranges from 0 degrees Celsius at 0 C charge rate to 22 degrees Celsius at 4.5 C charge rate, or maximum allowable charge rate.

c. Temperature operating limits based on the cell manufacturer's usage recommendations are established. In this present embodiment, the battery system will be operated between 30 and 15 degrees Celsius. Other ranges are possible, depending on the cell characteristics and manufacturer.

d. For maximum cell temperature rise, the thermal conditioning system must provide maximum cooling. For example, the maximum allowable temperature rise is 22 degrees. As such the corresponding setpoint is 15 degrees Celsius. When max temperature rise=0 max set point is 30, or off. In general, the method of determining the operating band can be tuned to the specific cell chemistry in use.

e. A mathematical function that maps temperature rise limits to setpoint limits, such that when cell temperature rise is 22 degrees Celsius, setpoint is 15 degrees Celsius is determined. In the present embodiment, the function is linear, but higher order polynomial functions are possible. If a nonlinear response in "y" (e.g., dT) is desired, such as may be required to address nonlinear control of some vehicle HVAC systems, other regression techniques that utilizes higher order polynomials can be employed. A function is determined that maps onto a range of set points bounded by the setpoint limits.

Using rules of functions, relations and the condition of temperature rise=0, setpoint=30: @x=0, y=b=30, m=rise/run, m=−(15/22)=−0.6808.

Therefore the mapping function is:

$$y=30-0.6808x$$

By analogy, 30 is the highest setpoint, m is −0.6808. This value is fixed for the required cooling range. One aspect, the temperature setpoint is determined in real time at each time interval according to the following rule:

T_setpoint =
T_setpoint_max−M*((I_AVG*α+(1−α)*I_CDR)$^2$*R_internal
/
(A*(I_AVG*α+(1−α)*I_CDR)$^B$*Acell))

where:
T_setpoint is the computed setpoint of the HVAC system in order to optimally control the battery;

T_setpoint_max=is the maximum setpoint of the system HVAC in accordance with an embodiment;

M a parameter determine by the method above. In the current example, the result is computed as M=−0.6808;

I_AVG is the average current of the battery duty cycle. In this example, we define a moving average of 10 seconds. Other durations are possible, and can be tuned for optimal performance.

α is a weigh parameter, α=0.2 in this example as determined by the duty cycle, α is a number from [0:1];

R_internal is battery internal resistance, function of cell properties and can be adjusted to reflect ESR from mechanical connections, and/or which can vary with the discharge depth and cell temperature;

A, B, R_internal and Acell are generally considered properties and/or of the cell and energy storage cell assembly. In some embodiments, A and B may be dimensionless coefficients associated with physical characteristics of an energy storage cell (e.g., derived curve fits) and Acell may relate to a quantitative or measurable characteristic of an energy storage cell (e.g. cross sectional area, cell value taken from an associated specification sheet, etc.)

In this aspect of the embodiment there is no need for complex conditional logic or override functions. The user can implement but it is not required. In another aspect specific to this embodiment a hybrid function of the type K*I+(1−K)I_bar, where K is a number between 0 and 1, and I_bar is understood as average current. Using instantaneous current for setpoint computation only results in over compensation of cooling. Using current average only smooths our transients which results in a lack of cooling performance. Use of the tunable hybrid scheme, which as one aspect of this embodiment provides the optimal thermal regulation for control of the battery.

The computed setpoint is compared with T_v_sensor and T_cell_actual. In the present embodiment, T_cell_actual is the physical reference temperature sensor and placed in particular at every fourth cell in the module, thus reducing the overall number of sensors required for monitoring. T_v_sensors is a virtual thermistor or temperature sensor determined by computation and solution of a computation heat transfer equation in the overall controller. This allows for a reduction of sensors and also a mechanism for verifying when calibration is required. By plotting the difference between the reference temperature and the numerical cell temperature is an indication of the overall state of health of the battery which can be communicated as diagnostic information to the overall system controller for analysis. The heat equation that is solved is in the following form:

$$\partial T/\partial t = k \partial^2 T/\partial^2$$

In another embodiment, the heat equation is solved in multidimensional form.

In another embodiment, the equations of mass, momentum and energy are solved in multidimensional form.

Using a reference cell temperature and numerical cell temperature, reconstructed with the use of a the numerically solved partial differential equations configured to represent the physical system and solve in real time the transient heat equation, allowing the simplification or reduction of thermal sensors.

For the purpose of illustrating the embodiment, the HVAC system that interfaces to Heat Exchanger (4) is sufficiently sized to remove or add the required heat into the thermal circuit. Based on the cell manufacturer's data, temperature operating limits will be taken to be between 15 and 30 degrees Celsius. The battery can be pre-cooled or pre-heated while charging from the electrical grid.

In the following text, "battery", "cells" are used to refer to a variety of energy storage chemistries that include all lithium based cell technology, lithium ion capacitors, EDLCs, NiMH batteries, Zinc, or any other. "Battery modules" are a plurality of cells electrically connected to each other, in an envelope that contains the plurality of cells. Cells can be of a variety of form factors such as cylindrical, pouch or prismatic. "Battery pack" is a plurality of modules electrically connected in series and/or parallel. "Energy Storage System" or "ESS" is used to refer to the entire battery pack assembly that has the ability to be charged and discharged for the purpose of powering an electric vehicle.

The embodiments include a communication interface, a processor and an actuator. The method includes acquiring a plurality of values based on an operating profile and parameter values that are indicative of current, and setting operating value thresholds.

The embodiments contain a control unit to thermally regulate an electrical energy storage system, including 1) actuation of contactors to connect the energy storage system to a load or power source such as the utility grid or an auxiliary power unit and 2) to limit current drawn from the energy storage device if temperature limits are exceeded.

According to one embodiment, an apparatus is used to thermally regulate and operate an electric energy storage module. Such a device may comprise, a measurement device or input signal for measuring a parameter such as battery current or parameter indicative of the load, or in units of Amps or operating profile;

a calculation device to compute expected temperature rise of the cell in the system in response to a load or anticipated load;

a calculation apparatus to compute the one dimension partial differential heat equation to determine the average cell temperature which is used in operation and thermal regulation of the energy storage system;

a calculation apparatus to compute a multidimensional partial differential mass, momentum and energy equations to determine the average cell temperature which is used in operation and thermal regulation of the energy storage system an apparatus to compute and memory device to store a time average value of the load over a user configurable time period;

whereas the stored time average value is used to compute a temperature setpoint for efficient thermal regulation;

whereas the measured process parameter indicating load is used to compute temperature setpoint;

whereas the theoretical temperature rise of the cell due to current drawn is used to compute a temperature setpoint for efficient thermal regulation of the energy storage system.

Another aspect of the embodiment is the method comprising:

measuring the process parameter indicative of the load on the energy storage system;

measuring a process parameter indicative of the load that will be requested from the energy storage system;

measuring a process parameter indicative of the ambient temperature;

computing an average value based on the process parameter indicative of the load on the energy storage system;

computing a control rule that is a function of the battery parameters and the process parameters that are indicative of the load on the energy storage system and the load that will requested of the energy storage system before a return command indicating the allowable current draw to the system within the time period and activating a thermal management system to thermally condition the fluid within the required setpoint;

solving a partial differential equation within the apparatus control unit for the determination of the average cell temperature signal for read back and control;

determining if the average cell temperature is within allowable limits and if so issue a signal allowing the requested current be drawn; and, determining if the average cell temperature is within allowable limits and if not issue a command to limit the allowable current that can be drawn in accordance with to the temperature rise term equation. (i.e. if the battery is at temp X, allowable temp rise is LIMIT-X, then back out the allowable current based on table lookup.

The method and apparatus may be incorporated into the energy storage package or be embodied in a stand-alone control system, and includes activating the control of a thermal conditioning device based on sampled input signals such as duty cycle current, reference cell temperatures, and the solution of a transient partial differential heat equation that represents the properties of the energy storage cell assembly. The embodiment can be also be applied under "fast charge" scenarios where charge rates are in excess of 1 C resulting from overnight charge to refill the vehicle's energy store, or from rapid acceleration and regeneration scenarios as part of the vehicles normal operation in use. The energy storage system in an electric vehicle such as a heavy duty transit bus, may contain a battery, ultra capacitor, or combination thereof. The energy storage system generally contains a plurality of electrochemical or electrostatic elements for the acceptance, delivery, and storage of electric power.

Reference FIG. 1 which is an illustrative schematic which depicts a thermal management loop used to heat or cool and electric energy storage system, and is useful in describing the embodiment. Battery Modules (1) comprise battery cells connected electrically to each other are shown (1). A cooling or heating fluid or gas which provides thermal conditioning is circulated through the battery modules and pipe system (5) and (6) in a closed loop. Pump (6) provides the means of circulating the fluid through the network. The thermal loop is hydraulically configured in parallel as shown to minimize the buildup of thermal gradients and also minimize pumping losses. Sensors (2) upstream and downstream of the battery modules are used for purposes of diagnostics and control. Heat is transferred to and from the thermal management loop in FIG. 1 via heat exchanger interface (7). Any device or system that is capable of adding and/or removing heat can be shown to connect with interface (7). These devices include, but are not limited to: fans, radiators, thermoelectric generators, refrigeration units or other. In operation, battery energy storage systems lose capacity with low temperature. If required the energy storage system can be pre-conditioned before use while charge connected to the grid to insure optimal re-charge conditions and that fully capacity is attained. Method's operating band can be tuned to fit the chemistry.

Figure 2A:
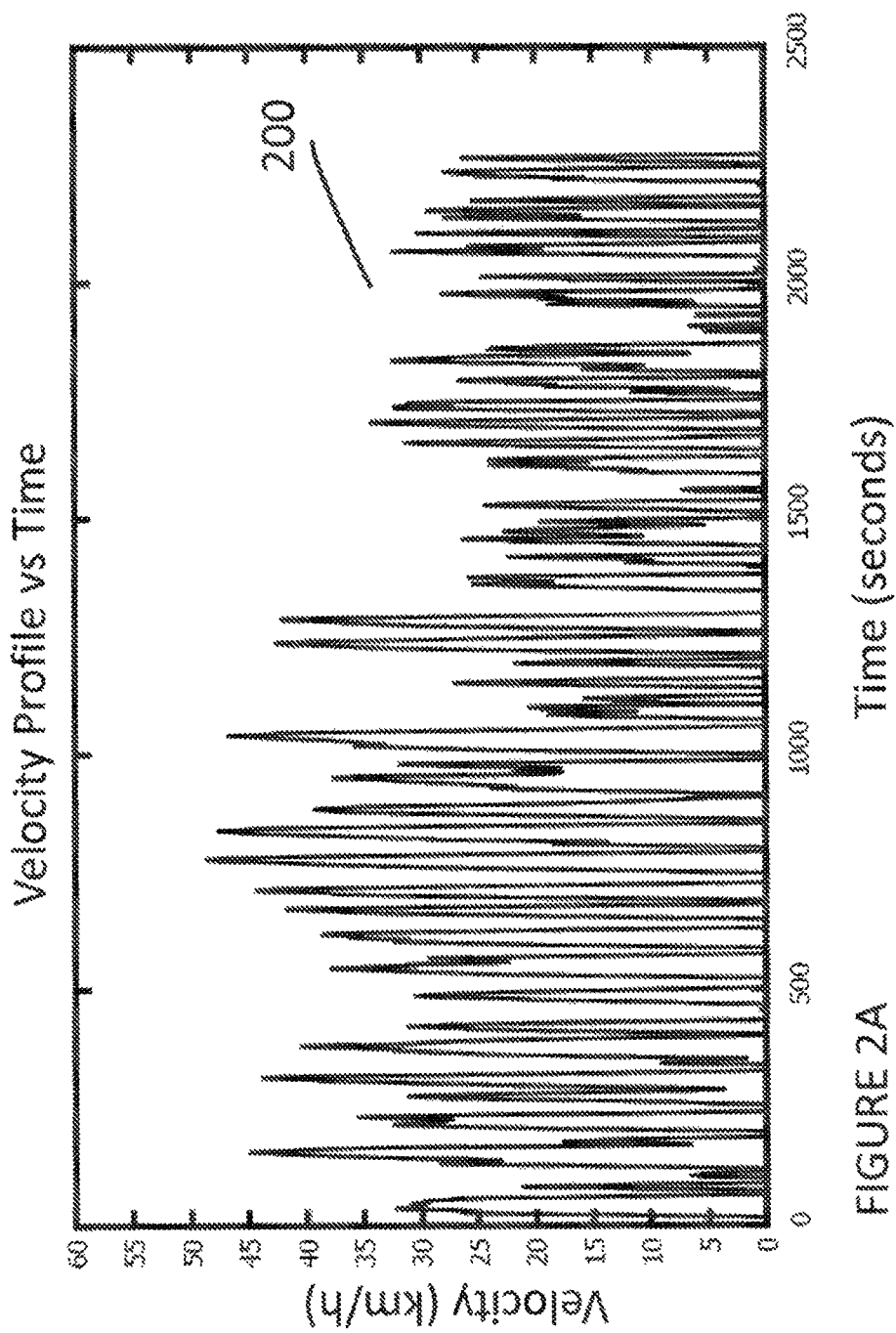
FIG. 2A graphically illustrates a typical drive schedule plot of vehicle velocity verses time.

FIGS. 2A and 2B graphically illustrate a typical drive schedule plot of vehicle velocity verses time. Drive schedules are used to characterize vehicle performance with respect to fuel economy, emissions, range, acceleration and other performance criteria. The figure shown with a 2300 second duration is similar to an inner city drive cycle that a typical heavy duty transit bus would repeat regularly in revenue service operation. The cycle may be repeated many times in the course of a daily single operating shift. FIG. 2B graphically illustrates a close-up of a typical electric drive schedule, for purpose of illustrating the embodiment.

Figure 3:
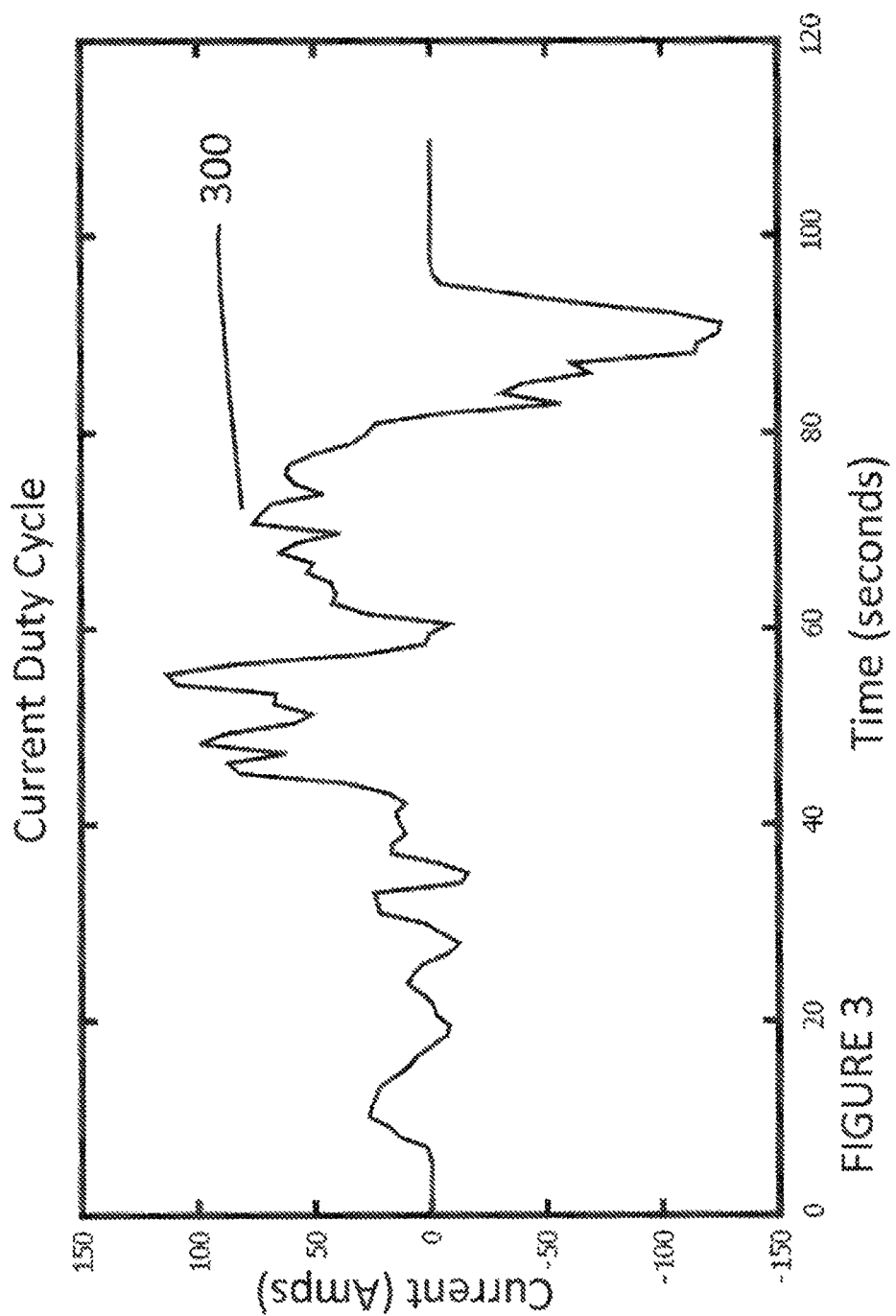
FIG. 3 graphically depicts the current duty cycle resulting from the aforementioned drive cycle.

FIG. 3 graphically depicts the current duty cycle resulting from the aforementioned drive cycle, otherwise known as an operating profile. FIG. 3 graphically shows an example plot of battery propulsion system current verses time for an electric heavy duty vehicle in response to the drive schedule FIG. 2B, as determined by numerical simulation. The operating profile is an input signal into the embodiment, and is generated by the overall system controller in response to the drive system duty cycle in use. In order to provide the power required to move the electric vehicle in a typical drive schedule, the electric vehicle' propulsion system will draw current from the energy storage system at a rate that correlates with the drive schedule. The amount of current and rate of current that the motors draw form the battery, or put back into the battery during energy recuperation may be a function of the propulsion system characteristics, drive schedule, operating environment, vehicle parameters such a weight, rolling resistance, air resistance to name a few. Duty cycles from grid utilities load cycles that can also be represented in a time varying manner.

Figure 4:
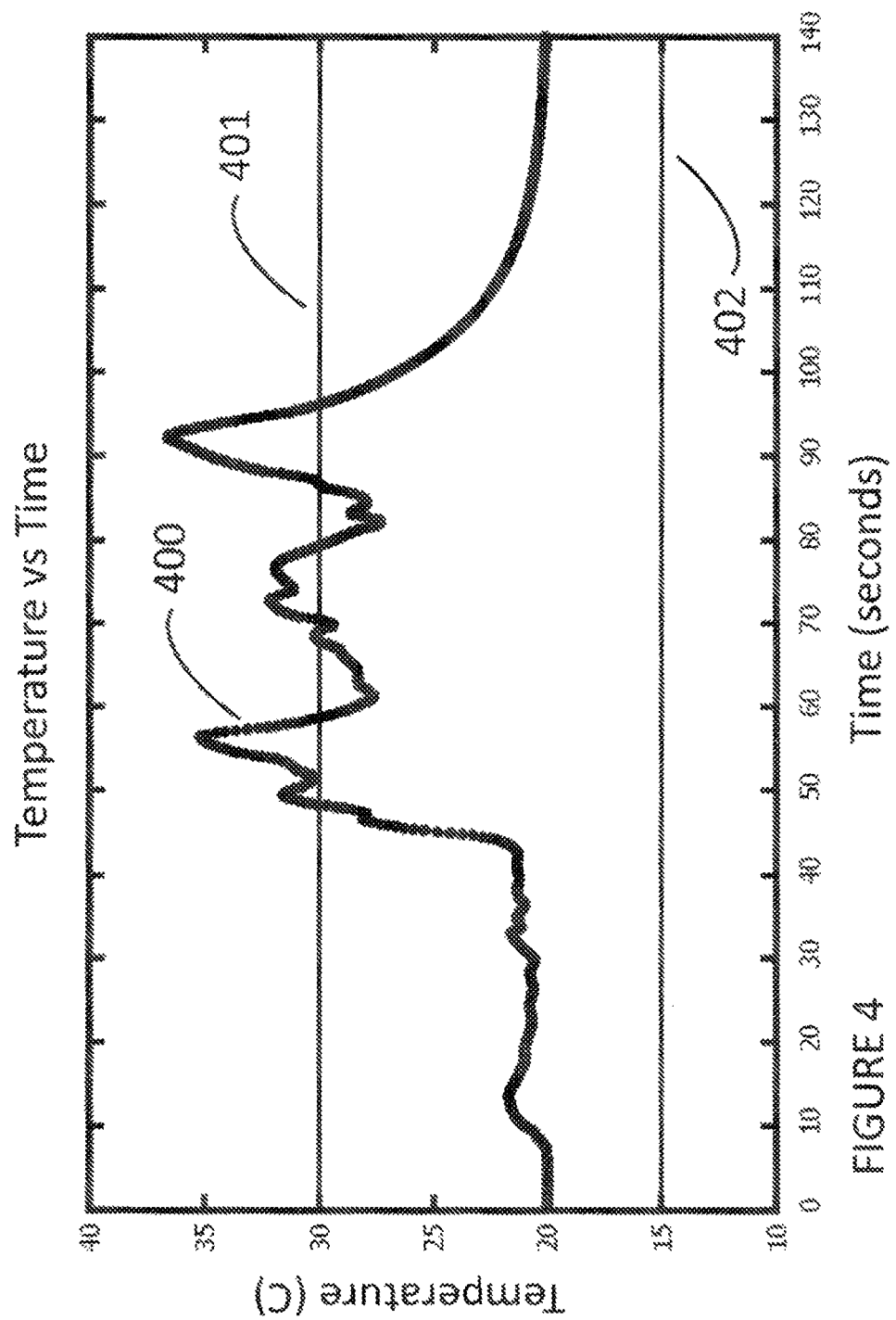
FIG. 4 graphically illustrates the temperature profile of a cell or module without temperature control.

FIG. 4 illustrates the temperature rise as a function of time of a battery cell in a battery pack as determined by numerical simulation by solving a partial differential heat equation parameterized with thermal characteristics and geometry of a cell and its supporting structure. The cell support structure inside a battery module is thermally conductive and provides a path for heat rejection media such as a thermal cooling fluid of the system in FIG. 1. The current duty cycle of FIG. 3 (300) is the input to the numerical model of the cell. The average temperature response (400) is shown in FIG. 4, which illustrates the effect allowing the regulating temperature to be equivalent to the ambient temperature of 20 degrees C., in the present example. In response to the current duty cycle, the cell temperature profile rises above the safe operating window of 30 degrees C. In the figure, the temperature of the cell is allowed to fluctuate without active cooling, allowing heat to dissipate to the environment. In this example the temperature profile (400) exceeds the recommended operating limits of the cell which, in this example, is between 30 and 15 degrees C., as depicted by the horizontal lines (401) and (402).

Figure 5:
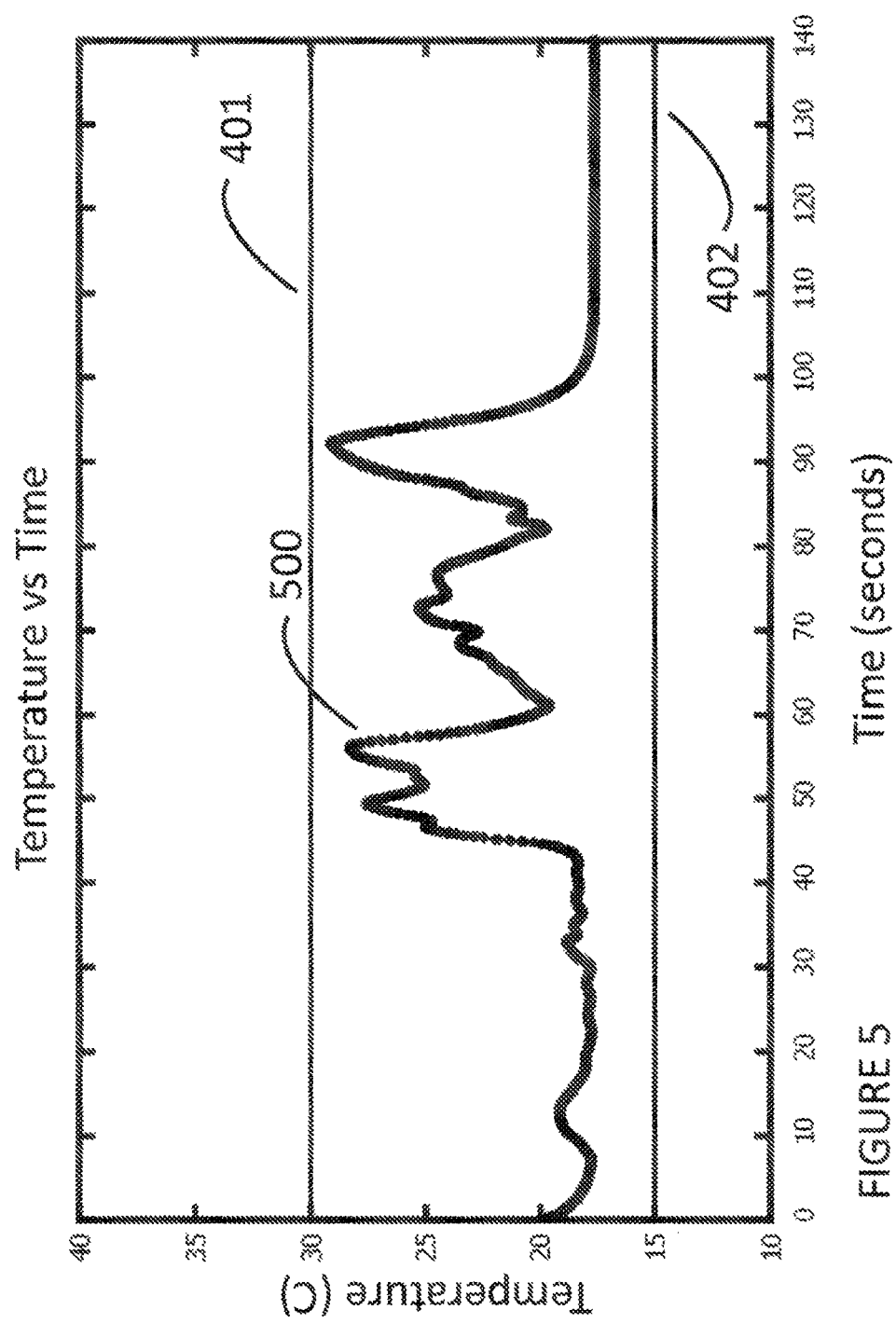
FIG. 5 graphically illustrates the temperature profile of a cell or module with temperature control system at maximum setpoint of 15 degrees C.

FIG. 5 demonstrates the effect of setting the cooling system to the lowest setpoint of 15 degrees C. The average cell temperature (500) is now within the prescribed optimal temperature range of 15 to 30 degrees C. at the expense of commanding the HVAC system to operate at a high duty cycle and thus consuming a maximum amount of energy from the vehicle battery pack which limits the range.

Figure 6:
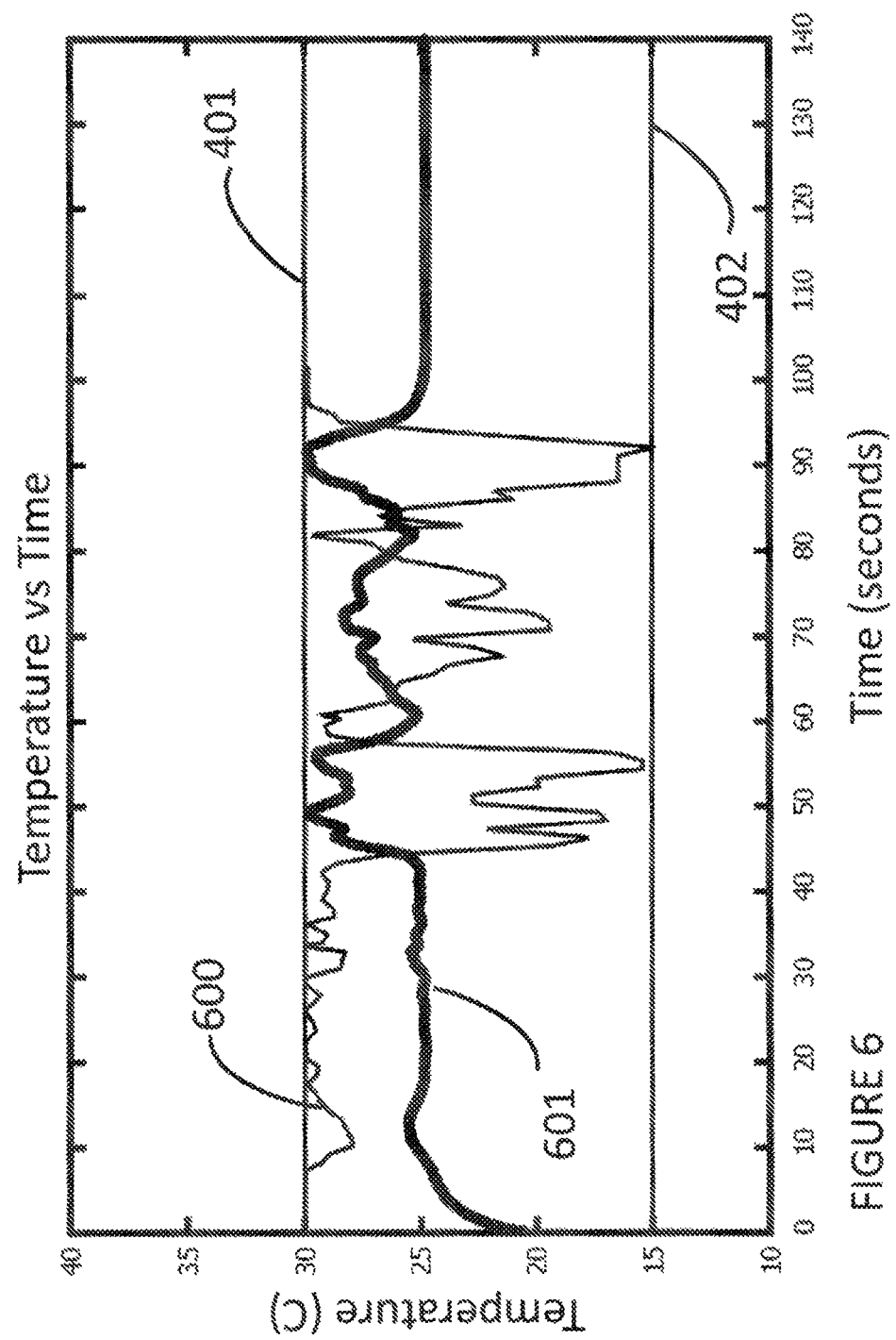
FIG. 6 graphically illustrates the temperature profile of a cell or module as regulated by an embodiment.

FIG. 6 demonstrates an embodiment where the temperature response of the battery cell (700) is dynamically and adaptively thermally managed by the embodiment.

Figure 7A:
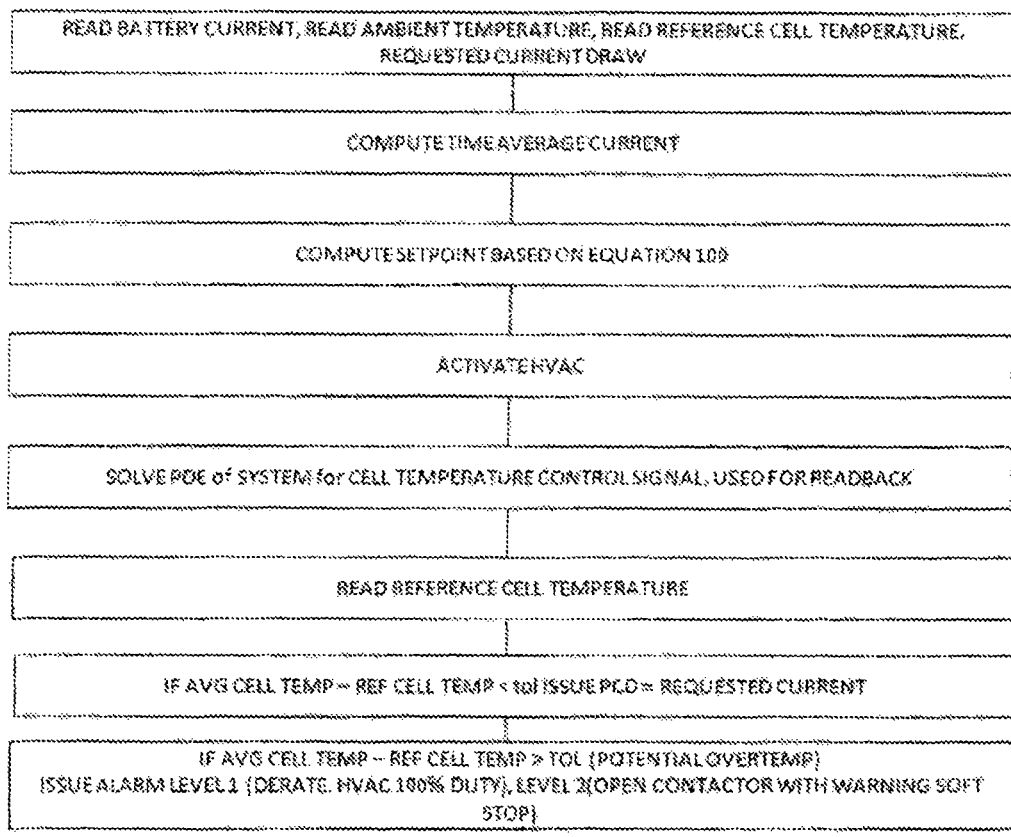
FIG. 7A illustrates the process to dynamically manage heat in an electric energy storage system.

FIG. 7A illustrates a process to dynamically manage heat in an electric energy storage system. In such an embodiment, the embodiment reads battery current, ambient temperature, reference cell temperature, and requested current draw. The time average current is computed. The setpoint is calculated. The HVAC system is activated. The partial differential equation of system for cell temperature control signal is solved, and used for read back. The reference cell temperature is read. If the average cell temperature-reference cell temperature is less than the tol (e.g., some tolerance), issue PCD (permissible current drop) or Requested current. If the average cell temperature-reference cell temperature is greater than the tol, there is potential over temperature, issue an alarm level 1 (rate. HVAC 100% duty), level 2 (open contactor with warning soft stop).

Figure 7B:
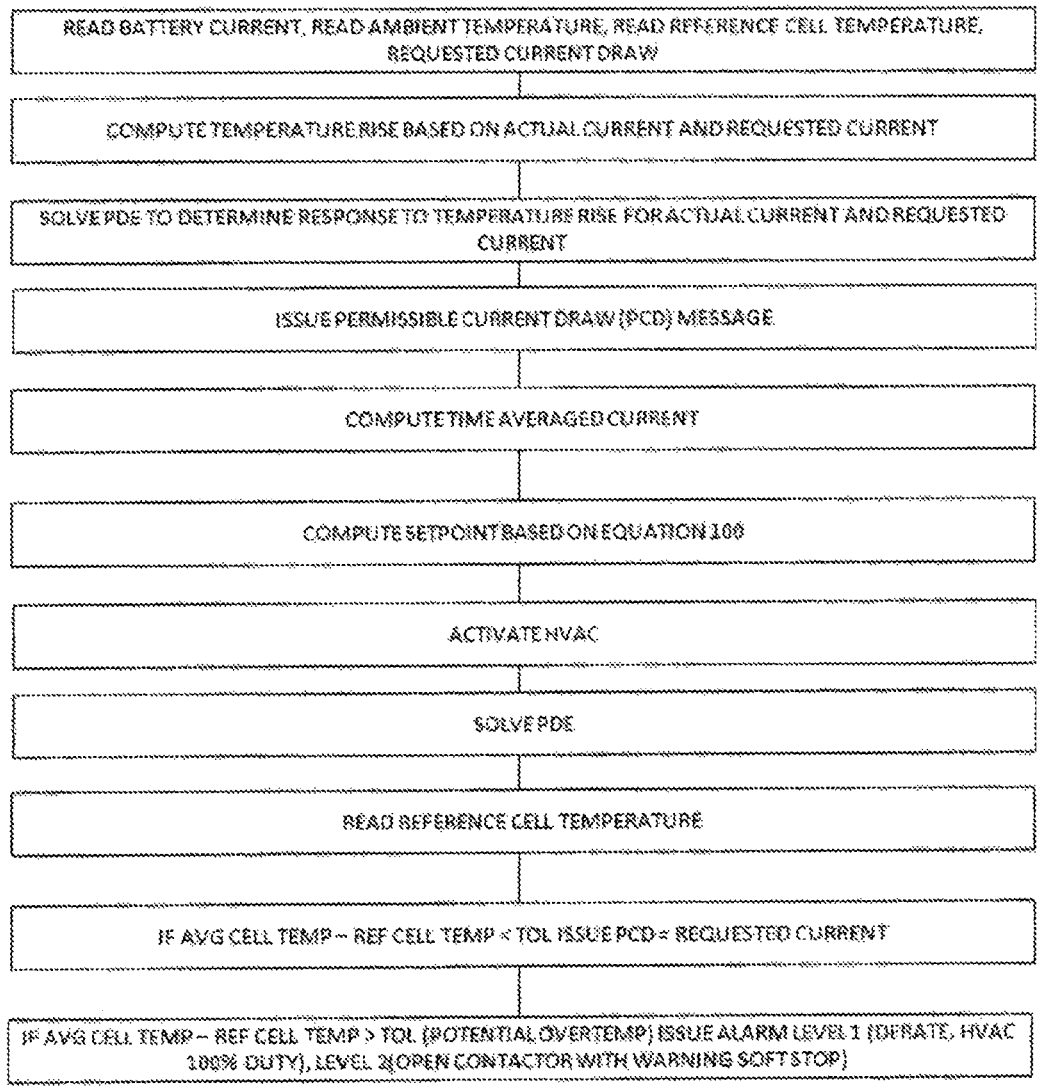
FIG. 7B illustrates the process another embodiment to dynamically manage heat in an electric energy storage system.

FIG. 7B illustrates another process to dynamically manage heat in an electric energy storage system. In such an embodiment, the embodiment reads battery current, ambient temperature, reference cell temperature, and requested current draw. The partial differential equation to determine response to temperature rise for actual current and requested current is solved. The system issues a permissible current draw (PCD) message. The time average current is computed. The setpoint is calculated. The HVAC system is activated. The partial differential equation of system for cell temperature control signal is solved, and used for read back. The reference cell temperature is read. If the average cell temperature-reference cell temperature is less than the tol, issue PCD=Requested current. If the average cell temperature-reference cell temperature is greater than the tol, there is potential over temperature, issue an alarm level 1 (rate. HVAC 100% duty), level 2 (open contactor with warning soft stop).

Figure 8:
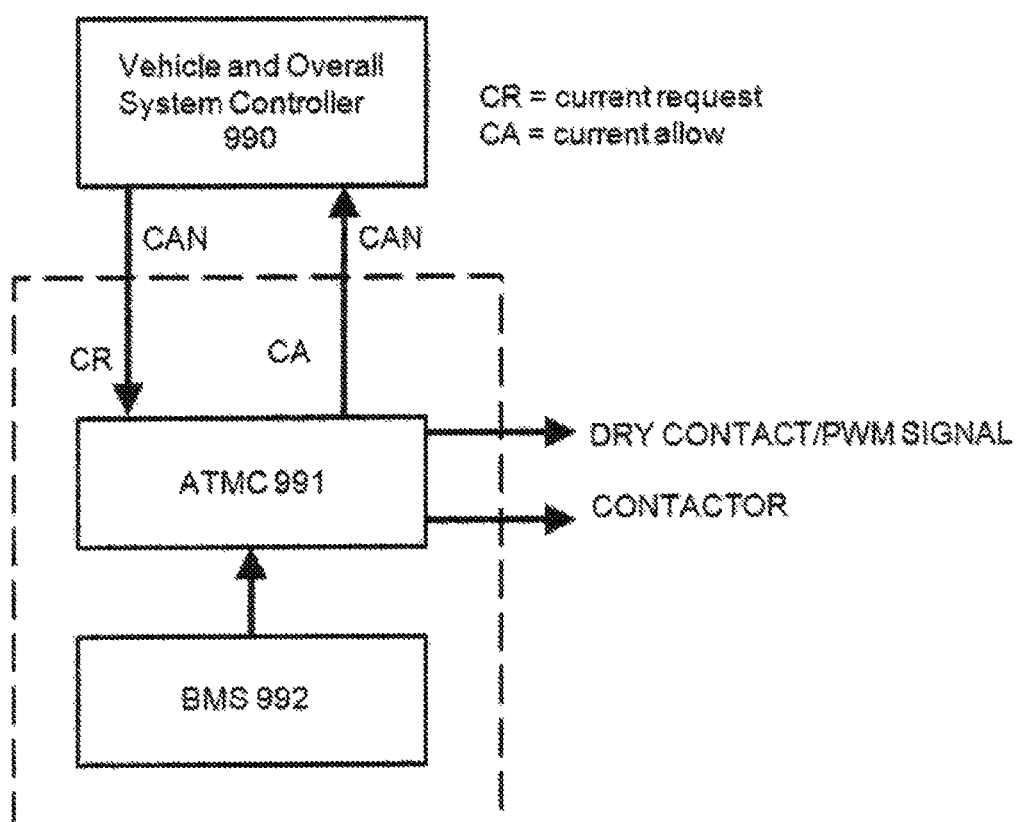
FIG. 8 illustrates an alternate embodiment to dynamically manage heat in an electric energy storage system.

FIG. 8 illustrates an alternate embodiment to dynamically manage heat in an electric energy storage system. In this embodiment, the vehicle and overall system controller communicates with ATMC 991, and BMS 992 provides input to ATMC 991.

Figure 9:
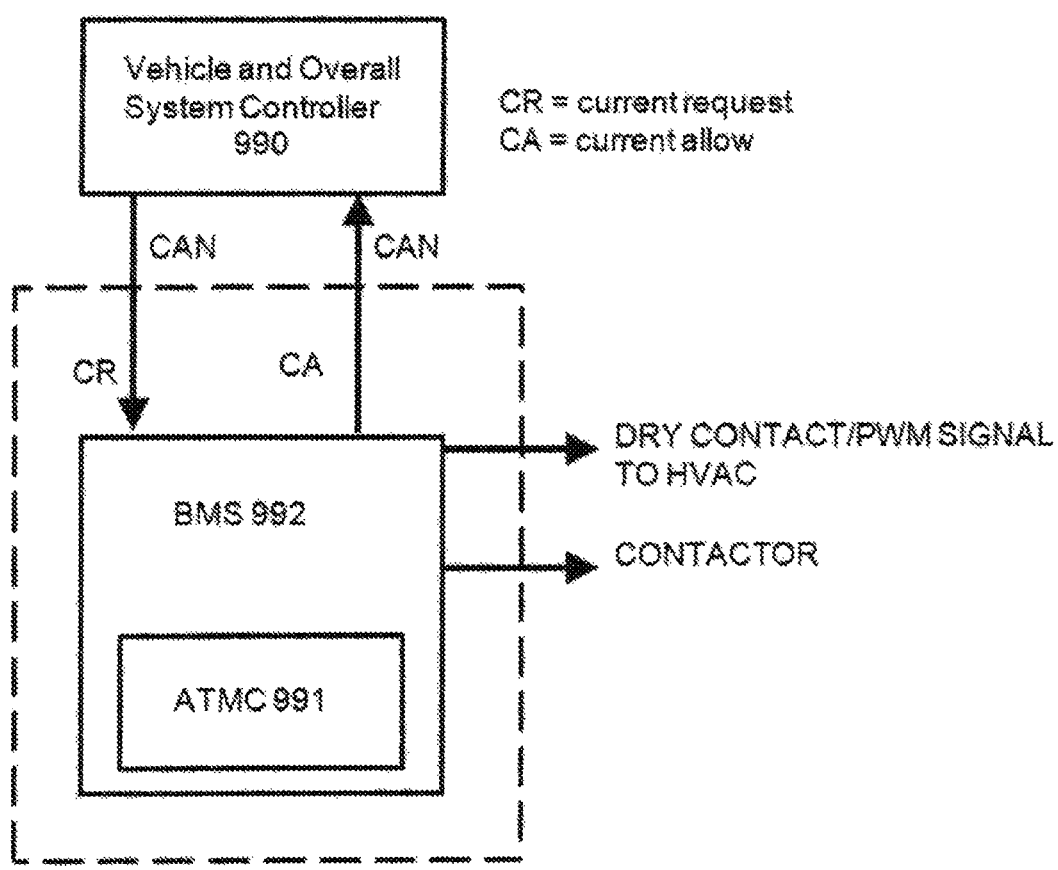
FIG. 9 illustrates an alternate embodiment to dynamically manage heat in an electric energy storage system.

FIG. 9 illustrates an alternate embodiment to dynamically manage heat in an electric energy storage system. In this embodiment, the vehicle and overall system controller communicates with BMS 992, which includes ATMC 991.

Figure 10:
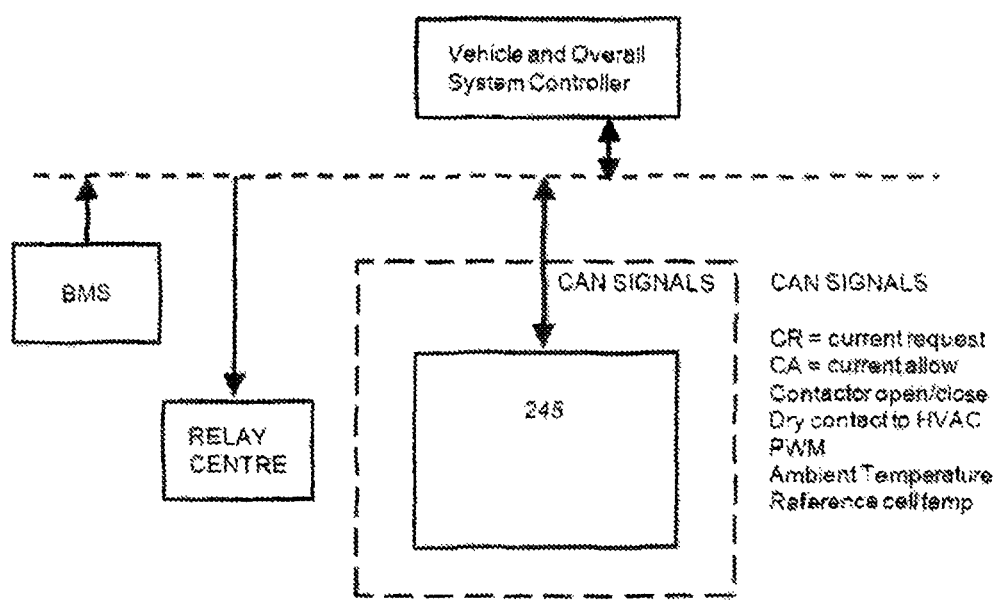
FIG. 10 illustrates another embodiment to dynamically manage heat in an electric energy storage system.

FIG. 10 illustrates another embodiment to dynamically manage heat in an electric energy storage system. In this embodiment, the vehicle and overall system controller communicates with the system along a bus.

Figure 11:
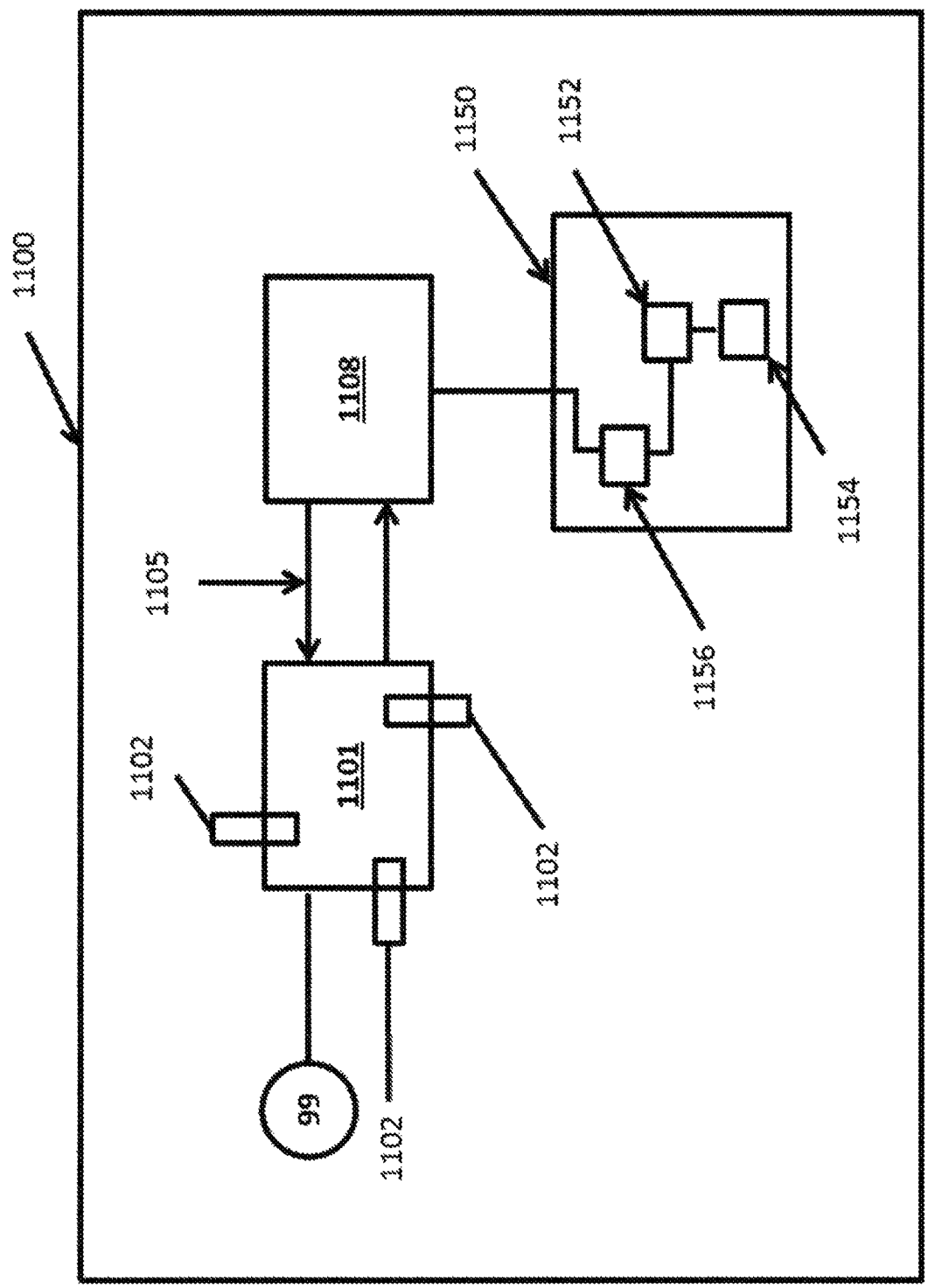
FIG. 11 is a schematic diagram of a thermally managed energy storage system for a variable electric load, according to an exemplary embodiment of the present disclosure.

FIG. 11 is a schematic diagram of a thermally managed energy storage system for a variable electric load, according to an exemplary embodiment of the present disclosure. As discussed above the thermally managed energy storage system 1100 may include an electric energy storage system 1101 including at least one energy storage module 1 (FIG. 1) having a plurality of energy storage cells, the electric energy storage system 1101 configured to electrically couple to and power the variable electric load 99, a plurality of thermal sensors 1102 configured to determine a cell temperature of at least one of the plurality of energy storage cells, a thermal management system 1108 including a heat exchanger 4 (FIG. 1), a pump 3 (FIG. 1), and a pipe system 1105 fluidly coupled together as a closed thermal loop, the thermal management system 1108 configured to thermally condition the plurality of energy storage cells by circulating a fluid through the electric energy storage system 1101, in response to a thermal control signal, and a thermal management controller 1150 communicably coupled to the variable electric load 99, to the thermal management system 1108, and to the plurality of sensors 1102. The thermal management controller 1105 may be configured to receive a current signal indicative of current being supplied from the electric energy storage system 1101 to the variable electric load 99, to receive an thermal signal from the plurality of thermal sensors 1102, the thermal signal indicative of the cell temperature of the at least one of the plurality of energy storage cells, to generate the thermal control signal based on an averaged current (I_AVE) from the electric energy storage system 1101 to the variable electric load 99, and a partial differential transient heat equation (PDE), and to communicate the thermal control signal to the thermal management system 1108.

As above, the thermally managed energy storage system 1101 may be integrated into an electric vehicle, for example, where the variable electric load 99 is a traction motor of the electric vehicle (e.g., fuel cell vehicle, ICE-EV, etc.). In some embodiments the thermal management system 1108 may be dedicated module, for example when used in a fuel cell application. Alternately, in some embodiments the thermal management system 1108 may be shared resource such as an engine or vehicle cooling system, for example when used in an internal combustion engine (ICE) application.

Alternate embodiments, discussed further below may include the thermally managed energy storage system 1101 integrated into/with an alternate energy generation system or device such as a wind turbine generator. According to one embodiment, the thermally managed energy storage system 1101 may be at least partially integrated in an overall system controller of the electric vehicle (or applicable device/system providing the variable electric load).

According to one embodiment, the thermal management controller 1150 may include a processor 1152, a memory 1154, and a communication module 1156. The communication module 1156 may be communicably coupled to the thermal management system 1108 and to the energy storage system 1101, the communication module 1156 may be configured to receive sensor data, performance data, and demand data of the energy storage system 1101, and further configured to issue thermal control commands to the thermal management system 1108. The memory 1154 may be configured to store a thermal management program, performance parameters, and logged data. The processor 1152 may be communicably coupled to the communication module 1156 and the memory 1154.

The processor 1152 may be configured to execute the thermal management program, examples of which are described above. As above, the thermal management program may be generally configured to receive a current signal via the communication module that is indicative of current being supplied from the electric energy storage system to the variable electric load, to receive an thermal signal from a plurality of thermal sensors via the communication module, the thermal signal indicative of the cell temperature of the at least one of the plurality of energy storage cells, to generate a thermal control signal by the processor 1152, and to communicate the thermal control signal to the thermal management system 1108 via the communication module 1156. As above, thermal control signal (T_setpoint) may be based on an averaged current (I_AVG) from the electric energy storage system 1101 to the variable electric load 99, and a PDE partial differential transient heat equation. Likewise, the thermal control signal may be operative to cause the thermal management system 1108 to regulate a thermal state of the electric energy storage system 1101. In other embodiment, the thermal control signal may be operative to cause the thermal management system 1108 to regulate a thermal state of a portion of the electric energy storage system 1101.

It is understood that one or more sub-modules of the thermal management controller 1150 may be combined, integrated, or otherwise share resources. Further, it should be understood the various illustrative blocks and modules described throughout can be implemented in various forms. The terms "module," "component" or "circuit" as used herein, individually or collectively refer to hardware, firmware, software and any associated hardware that executes the software, or any combination of these elements for performing the associated functions described herein. Some blocks and modules have been described above generally in terms of their functionality, which may be implemented depending upon design constraints imposed on an overall system. Skilled persons can implement the described functionality in a variety of ways in each particular application. Further, the grouping of functions within a module, block, or unit is for ease of description. Specific features or functionality can be moved from one module or block or distributed across to modules or blocks without departing from the disclosure.

The thermal management controller 1150 may include components and/or circuitry or otherwise be configured to be powered from its host system/device. For example, the thermal management controller 1150 may include a vehicle power interface coupleable to the vehicle battery and/or the electric energy storage system 1101. Further, the thermal management controller 1150 may include a voltage regulator or other power conditioning componentry configured to provide DC power of the vehicle battery to the various components of the thermal management controller 1150.

The memory 1154 may include any non-transitory computer-readable or processor-readable storage media and any associated circuitry. By way of example but not limitation, such non-transitory computer-readable or processor-readable storage media may include onboard FLASH memory, dynamic memory, RAM, ROM, EEPROM, FLASH memory, optical/magnetic disk storage, or any other medium that may be used to store desired program code in the form of instructions or data structures and that may be accessed by a processor or computer. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product. If implemented in software, the functions may be stored on or transmitted over as one or more instructions or code on a computer-readable medium.

The processor 1152 may include a general purpose processor, an integrated circuit (IC), an analog IC, a mixed signal IC, an application specific integrated circuit (ASIC), a field programmable gate array (FPGA), a digital signal processor (DSP), System on a Chip (SoC), and/or other programmable logic devices, discrete gates or transistor logic, discrete hardware components, or any combination thereof designed to perform the functions described herein. The general-purpose processor may be a microprocessor, but, in the alternative, the processor may be any conventional processor, controller, microcontroller, or state machine. The processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function. Further, the processor module 255 may be a stand-alone device or may be part of a larger device. Also, features and attributes of the specific example modules disclosed above may be combined in different ways to form additional modules or may be embodied as software and/or firmware on or of a processor the processor 1152, all of which fall within the scope of the thermal management controller 1150.

According to one embodiment, controller and/or system may also be applied to thermal management for alternative energy systems such as wind turbines and associated support equipment that are heat generating-based on current. The system/controller may cool the components of the wind turbine, such as gearboxes, power electronics, and wind dynamic control devices (e.g., wind blade pitch control systems), with the system including a controller, liquid cooling loops, pumps, fans, heat exchangers, and controller configured to compute a system of multidimensional time dependent partial differential equations that may include a numerical representation and geometric data model of the components of the entire thermal management system connected with the components for the generation of control signals, as discussed above.

According to one embodiment, controller and/or system may also be applied to thermal management for fuel cell stacks, power modules and systems, and heat generating support equipment to cool the components of the fuel cell stacks such as cells, modules, stacks, electronics, with system comprising of controller, liquid or air cooling systems, pumps, fans, heat exchangers, refrigeration devices, thermoelectric coolers, with controller configured to compute a system of multidimensional time dependent partial differential equations that may include a numerical representation of the entire thermal management system connected with the fuel cell system for the generation of control signals, and to compute a system of multidimensional time dependent partial differential equations that may include a numerical representation of the entire thermal management system and the fuel cell system for the generation of control signals, as discussed above.

According to one embodiment, controller and/or system may also be applied to thermal management for alternative energy systems such solar power generation equipment and heat generating support equipment to cool the components of the solar power generation equipment such as cells, modules, power electronics, with the system including a controller, liquid or air cooling systems, pumps, fans, heat exchangers, refrigeration devices, thermoelectric coolers, with controller configured to compute a system of multidimensional time dependent partial differential equations that may include a numerical representation of the entire thermal management system connected with the solar power system for the generation of control signals, and to compute a system of multidimensional time dependent partial differential equations that may include a numerical representation of the entire thermal management system and the solar power system for the generation of control signals, as discussed above.

According to one embodiment, controller and/or system may also be applied to thermal management for nuclear power generation equipment and heat generating support equipment to cool the components of the device such as reactors, modules, electronics, with system comprising of controller, liquid or air cooling system, pumps, fans, heat exchangers, refrigeration devices, thermoelectric coolers, with controller configured to compute a system of multidimensional time dependent partial differential equations that may include a numerical representation of the entire thermal management system connected with the nuclear power generation equipment and heat generating support equipment for the generation of control signals, and to compute a system of multidimensional time dependent partial differential equations that may include a numerical representation of the entire thermal management system and the nuclear power system for the generation of control signals, as discussed above.

According to one embodiment, controller and/or system may also be applied to thermal management for grid energy storage, or battery bank energy storage equipment and heat generating support equipment to cool the components of the device such as reactors, modules, electronics, with system comprising of controller, liquid or air cooling system, pumps, fans, heat exchangers, refrigeration devices, thermoelectric coolers, with controller configured to compute a system of multidimensional time dependent partial differential equations that may include a numerical representation of the entire thermal management system connected with the grid energy storage, or battery bank energy storage equipment and heat generating support equipment for the generation of control signals, and to compute a system of multidimensional time dependent partial differential equations that may include a numerical representation of the entire thermal management system and the grid energy storage system, or battery bank energy storage system for the generation of control signals, as discussed above.

In some embodiments, a system of multidimensional time dependent partial differential equations representing the entire system is solved to obtain virtual properties using a geometric model of the cells, module and system, thus reducing the number of required sensors in the system.

Application of this disclosure and principles herein may include use in high utilization medium and heavy duty vehicles.

It is understood by those familiar with the art that the system described herein may be implemented in hardware, firmware, or software encoded on a non-transitory computer-readable storage medium.

The previous description of the embodiments is provided to enable any person skilled in the art to practice the disclosure. The various modifications to these embodiments will be readily apparent to those skilled in the art, and the generic principles defined herein may be applied to other embodiments without the use of inventive faculty. Thus, the present disclosure is not intended to be limited to the embodiments shown herein, but is to be accorded the widest scope consistent with the principles and novel features disclosed herein.

The invention claimed is:

1. A thermal management controller for a thermal management system of an energy storage system for a variable electric load, the energy storage system having a plurality of energy storage cells, the thermal management controller comprising:
   a communication module communicably coupled to the thermal management system and to the energy storage system, a communication port configured to receive sensor data, performance data, and demand data of the energy storage system, and further configured to issue thermal control commands to the thermal management system;
   a memory configured to store a thermal management program, performance parameters, and logged data;
   a processor communicably coupled to the communication module and the memory, the processor configured to execute the thermal management program, said thermal management program configured
   to receive a current signal via the communication module that is indicative of current being supplied from the energy storage system to the variable electric load,
   to receive a thermal signal from a plurality of thermal sensors via the communication module, the thermal signal indicative of a cell temperature of at least one of the plurality of energy storage cells,
   to generate a thermal control signal by the processor that is based on an averaged current from the energy storage system to the variable electric load, and a partial differential transient heat equation, and to communicate the thermal control signal to the thermal management system via the communication module, said thermal control signal operative to cause the thermal management system to regulate a thermal state of at least a portion of the energy storage system.

2. A thermally managed energy storage system for a variable electric load, the thermally managed energy storage system comprising:

an electric energy storage system including at least one energy storage module having a plurality of energy storage cells, the electric energy storage system configured to electrically couple to and power the variable electric load;

a plurality of thermal sensors configured to determine a cell temperature of at least one of the plurality of energy storage cells;

a thermal management system including a heat exchanger, a pump, and a pipe system fluidly coupled together as a closed thermal loop, the thermal management system configured to thermally condition the plurality of energy storage cells by circulating a fluid through the electric energy storage system, in response to a thermal control signal; and a thermal management controller communicably coupled to the variable electric load, to the thermal management system, and to the plurality of sensors, the thermal management controller configured to receive a current signal indicative of current being supplied from the electric energy storage system to the variable electric load, to receive a thermal signal from the plurality of thermal sensors, the thermal signal indicative of the cell temperature of the at least one of the plurality of energy storage cells, to generate the thermal control signal based on an averaged current from the electric energy storage system to the variable electric load, and a partial differential transient heat equation, and to communicate the thermal control signal to the thermal management system.

3. The thermally managed energy storage system of claim 2, wherein the thermally managed energy storage system is integrated into an electric vehicle; and wherein the variable electric load is a traction motor of the electric vehicle.

4. The thermally managed energy storage system of claim 3, wherein the electric energy storage system is further configured to be charged by an onboard fuel cell of the electric vehicle.

5. The thermally managed energy storage system of claim 3, wherein the electric energy storage system is further configured to be charged by an onboard internal combustion engine of the electric vehicle; and wherein the thermal management system is further configured to thermally condition the onboard internal combustion engine.

6. The thermally managed energy storage system of claim 2, wherein the variable electric load is a wind turbine generator.

7. An apparatus for an electric vehicle, the electric vehicle including an overall system controller of the electric vehicle, the apparatus comprising:

an energy storage system with an energy storage module connectable to an electric load, the energy storage module having a battery or ultra-capacitor, the battery or ultra-capacitor having at least one cell;

a heating or cooling device including a heat exchanger, a pump, and a pipe system fluidly coupled together as a closed thermal loop, the heating or cooling device configured to heat or cool the battery or ultra-capacitor by circulating a fluid through the energy storage system, in response to a thermal control signal;

a thermal management control unit configured to receive a first current input signal indicative of current being supplied from the battery or ultra-capacitor to the electric load, to receive a second current input signal from the overall system controller of the electric vehicle, the second current input signal from the overall system controller of the electric vehicle including a request for current to be supplied from the battery or ultra-capacitor at a specific time, at a specified current, to receive a first temperature input signal indicative of a cell temperature of the at least one cell, the cell temperature to be used in an operation of the thermal management system, to receive a second temperature input signal indicative of an ambient temperature in which the battery or ultra-capacitor is operated, the ambient temperature for the operation of the thermal management system, to compute an averaged current from the energy storage system, and to compute a partial differential transient heat equation, for the generation of cell temperature control signals, and to output to the overall system controller of the electric vehicle a signal representing an allowable current to be supplied from the battery or ultra-capacitor to the electric load, and to output to the overall system controller of the electric vehicle the thermal control signal.

* * * * *